M. SMOLENSKY.
WORK HOLDER FOR MACHINE TOOLS.
APPLICATION FILED JUNE 5, 1915.
1,154,450.
Patented Sept. 21, 1915.
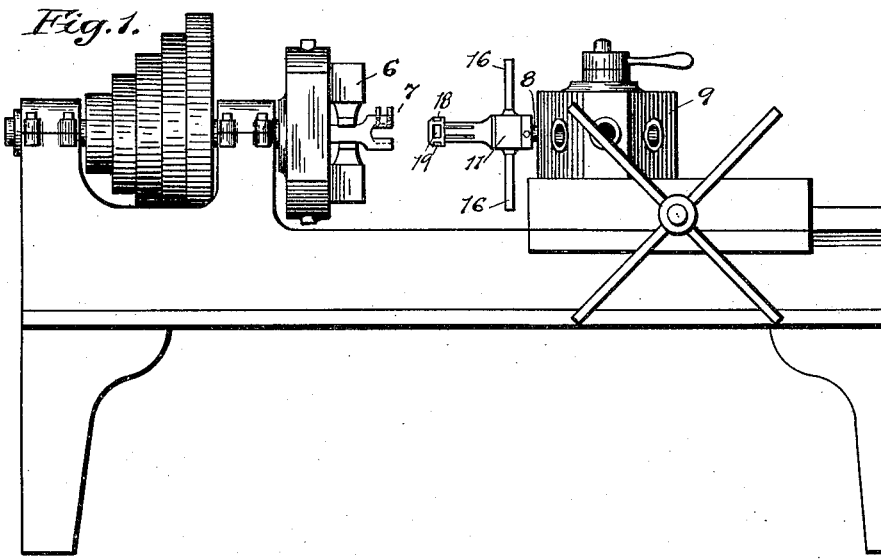
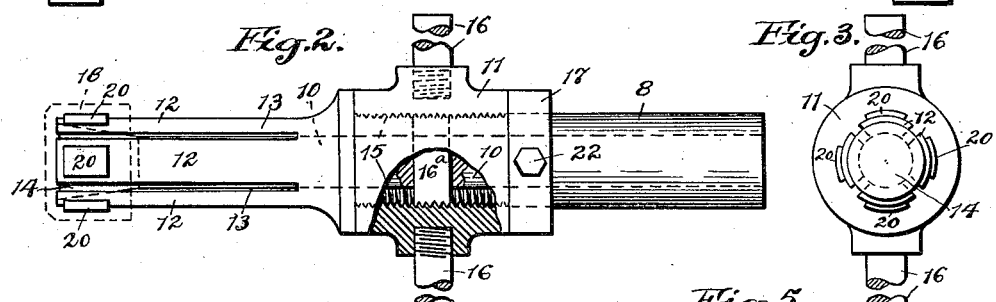
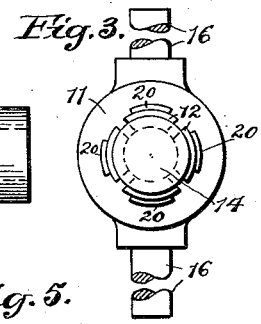
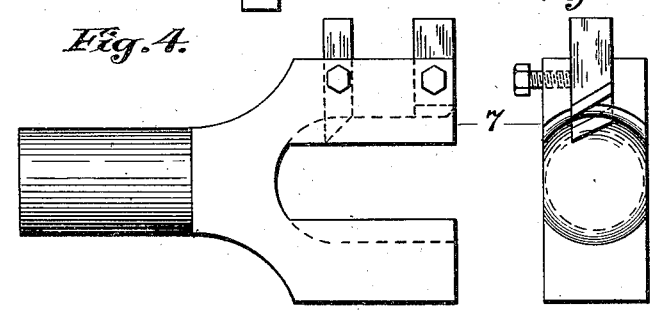
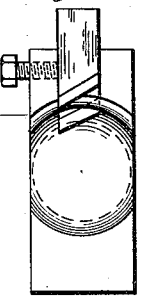
Witnesses
S. W. Brainard.
Inventor
Michael Smolensky
By John A. Bommhardt
Attorney

UNITED STATES PATENT OFFICE.

MICHAEL SMOLENSKY, OF CLEVELAND, OHIO.

WORK-HOLDER FOR MACHINE-TOOLS.

1,154,450.  Specification of Letters Patent.  Patented Sept. 21, 1915.

Application filed June 5, 1915. Serial No. 32,280.

*To all whom it may concern:*

Be it known that I, MICHAEL SMOLENSKY, a subject of the Emperor of Austria-Hungary, residing at Cleveland, in the county of Cuyahoga and State of Ohio, have invented certain new and useful Improvements in Work-Holders for Machine-Tools, of which the following is a specification.

This invention relates to work holders for machine tools, and comprises particularly a chuck or device for holding a cup shaped valve while it is operated on by a facing and chamfering tool.

The holder comprises an expanding chuck the head of which is inserted within the cup shaped valve or work, so that the exterior of the valve may be acted on by a cutting or finishing tool.

The invention is illustrated in the accompanying drawings in which—

Figure 1 is a side elevation of an ordinary turret lathe provided with the invention. Fig. 2 is a side elevation of the work holder. Fig. 3 is a front end view thereof. Figs. 4 and 5 are side and end views of the cutter.

The machine may be of any ordinary type having an ordinary two jawed chuck 6 on the spindle to hold the cutting or finishing tool indicated at 7 and shown in Figs. 4 and 5. The work holder shown in Figs. 2 and 3 has a shank 8 held in one of the sockets of the turret 9, and reduced at its front end as indicated at 10 where it extends into the bore of a sleeve 11, the front part of which is reduced as indicated. This reduced part is slitted lengthwise as shown at 13 to form fingers 12. At its front end the rod 10 has a conical head 14 against which the fingers 12 rest. The rear part of the sleeve 11 is threaded internally as indicated at 15, and these threads screw on a threaded block 16ª held in the rod 10. The sleeve 11 is provided with arms 16 whereby it may be turned, and an adjustable collar 17, on the shank 8, may be set up against the sleeve 11 to hold it in adjusted position. The cupped valve or work is indicated at 18, and has holes or openings 19 in the side thereof. The fingers 12 have bosses 20 to fit into said openings. In use, the cage or cupped valve 18 is slipped over the front end of the fingers 12, and then by means of the handles 16 the sleeve 11 is turned and is advanced outwardly by the screw. This expands the fingers 12 as they ride up the incline of the conical head 14, and the work is gripped on the inside, the bosses 20 entering the openings 19 to prevent rotation of the work. The collar 17 is then set up and fixed by a set screw 22 to hold the parts. The turret is then advanced to bring the work against the cutting tool, the rotation of which faces and otherwise finishes the work thus advanced thereto.

The device will be found very useful for the stated purpose or for gripping other hollow or cupped articles during an operation thereon.

What I claim as new is:

1. A work holder comprising a fixed shank having a conical head at the front end thereof and shaped at the rear end to fit in a socket, a sleeve adjustable along the shank and having expansible fingers bearing against said head and adapted to be expanded thereby to gripping contact with the inside of a hollow piece of work, and means to hold the sleeve at adjustment.

2. A work holder comprising a supporting shank having a conical head at the front end, and a sleeve screwed on the shank and split lengthwise to form a plurality of expansible fingers surrounding and bearing against said head and adapted to be expanded thereby, and means to hold the sleeve at adjustment on the shank.

3. A work holder comprising a shank having a conical head at the front end, a sleeve screwed on the shank and having expansible work gripping fingers bearing upon said head and adapted to be expanded thereby and a set collar on the shank, behind the sleeve, to hold the same in adjusted position.

In testimony whereof, I affix my signature in presence of two witnesses.

MICHAEL SMOLENSKY.

Witnesses:
JOHN A. BOMMHARDT,
J. B. DAVIS.

Copies of this patent may be obtained for five cents each, by addressing the "Commissioner of Patents, Washington, D. C."